United States Patent

Jung

[11] 4,107,839
[45] Aug. 22, 1978

[54] MANUALLY GUIDED CUTTING MACHINE FOR SHEET MATERIAL

[75] Inventor: Rolf Jung, Waiblingen, Fed. Rep. of Germany

[73] Assignee: Krauss u. Reichert GmbH & Co. KG Spezialmaschinenfabrik, Fed. Rep. of Germany

[21] Appl. No.: 794,613

[22] Filed: May 6, 1977

[30] Foreign Application Priority Data

May 6, 1976 [DE] Fed. Rep. of Germany ... 7614335[U]

[51] Int. Cl.² ............................................. B26D 1/10
[52] U.S. Cl. ..................................... 30/123.3; 30/273
[58] Field of Search ...................... 30/123.3, 273, 274, 30/275; 83/561

[56] References Cited

U.S. PATENT DOCUMENTS

| 767,076 | 8/1904 | Mattison | 30/123.3 |
| 2,575,695 | 11/1951 | Ulrich | 30/273 |
| 3,303,861 | 2/1967 | Kane | 30/374 |
| 3,533,161 | 10/1970 | Magnin | 30/273 X |
| 3,572,202 | 3/1971 | Gerber | 30/275 X |

*Primary Examiner*—Jimmy C. Peters
*Attorney, Agent, or Firm*—Leydig, Voit, Osann, Mayer & Holt, Ltd.

[57] ABSTRACT

A manually guided cutting machine for cutting stacked layers of cloth and the like which includes a frame having a downwardly extending column with a foot plate of flat extensive construction for supporting the machine on a cutting table as the machine is manually guided. A reciprocated knife blade at the front edge of the column, driven by an air motor on the frame, cuts into the material supported upon the foot plate. Exhaust air from the motor is conducted to a centrally located confined recess under the foot plate free of any communication with the top of the plate so that the foot plate floats on a cushion of air and with the noise of the exhaust air being muffled by the foot plate and the overlying material.

9 Claims, 3 Drawing Figures

MANUALLY GUIDED CUTTING MACHINE FOR SHEET MATERIAL

The invention relates to a manually guided cutting machine for sheet material comprising a foot plate and a compressed air motor to drive a cutting member.

In known motor driven manually operated tools comprising a compressed air motor the compressed air and the exhaust air are supplied and removed via a double walled pipe, for if the exhaust air from the compressed air motor (compressed air turbine) were allowed to flow out within the range of the machine itself, not only would the air flow cause a disturbance, but above all, the noise made by the exhaust air as it flows out, which is impossible for the machine attendant to endure over a longer period of time. This is the reason for the hitherto adoption of the conventional method of removing the exhaust air from the machine via the outer channel of a double walled compressed air pipe in the manually guided cutting machines of the aforesaid kind.

Owing to the fact that double walled pipes of this kind are not only relatively expensive, but also less flexible than single walled pipes and thus make it more difficult to handle the machines, the object of the invention was to solve the problem of the removal of exhaust air from manually guided cutting machines of the aforesaid kind more satisfactorily than ever before. According to the invention this is achieved by the footplate comprising on its underside at least one outlet opening for the exhaust air from the compressed air motor. The solution according to the invention is not only suitable for cutting machines with a reciprocating knife blade and comprising a relatively large foot plate on which the machine rests, but also for cutting machines with a rotating disk type of driven knife blade and a relatively large foot plate. In the known manually guided cutting machines the foot plate is provided with rollers on its underside to enable the machines to be guided more easily over a table. Since the rollers are mounted in the foot plate, the latter must necessarily be relatively thick. Furthermore, the presence of these rollers produces a space between the underside of the foot plate and the surface of the table and so the known cutting machines usually have hinged to the front of the foot plate a flap which is spring-pressed against the surface of the table and ensures that the foot plate glides under the sheet material to be cut, which is arranged in several layers on the table. The inventor has ascertained that conducting the exhaust air away in the direction of the underside of the foot plate and allowing it to flow out there not only solves the problem of noise reduction, but at the same time rollers on the underside of the foot plate can be dispensed with, for the exhaust air creates a cushion of air underneath the foot plate on which the cutting machine can easily glide. Thus, the foot plate of the inventive cutting machine can have a substantially flatter form, and furthermore, owing to its more simple design it can be manufactured more cheaply. Since the exhaust air flows off in all directions in an extremely thin layer underneath the foot plate, the aforementioned resilient flap can also be dispensed with, because the space between the foot plate and the surface of the table is correspondingly small and the exhaust air flowing forth beneath the foot plate prevents a layer of the sheet material to be cut from entering the space between the foot plate and the table. Furthermore, the elimination of the rollers results in a further advantage:

Manually guided cutting machines having a reciprocating knife blade are very often used for cutting narrow radii and sharp corners. Since conventional rollers are not steerable, they do not effect true rolling motion when turning bends, but rather by way of sliding motions in a transverse direction in relation to the rolling direction of the rollers, cause increased friction which, depending on the radius of the bend, results in greatly increased sliding resistance on the part of the machine. The inventive air cushion, on the other hand, produces uniform friction in each direction of motion and the sliding resistance is substantially reduced particularly when turning bends.

Extending in an upward direction from the foot plate to the machine housing of the known manually guided cutting machines with a reciprocating knife blade is a column about which the machine is rotated during the cutting operation. In order that the rotational motions not be hindered by an exhaust air conduit leading from the compressed air motor to the underside of the foot plate, it is particularly recommended that an air channel opening into the outlet opening be provided at and preferably in the column, which is best achieved by disposing the exhaust air channel behind the rearward edge of the reciprocating knife blade. This involves no serious changes in or special parts for the known cutting machine with a reciprocating knife blade, for it is quite sufficient to displace the sheath for the reciprocating knife blade which is normally provided and is held in a longitudinal slit in the column, forward a little, so that the rearward edge of the knife sheath is disposed at a distance from the bottom of the longitudinal slit, so as to thus form an exhaust air channel between the bottom of the longitudinal slit and the knife sheath.

Mounting the exhaust air channel in the column and beside or behind the knife sheath has the further advantage that the reciprocating knife blade, the knife sheath and the column which otherwise become increasingly hot as a result of the knife friction, are cooled.

The provision on the underside of the foot plate of a shallow recess into which the exhaust air channel opens helps to form a uniform cushion of air underneath the foot plate.

In order that the foot plate may adapt to any unevenness in the supporting surface, i.e., usually in the table, in a preferred embodiment of the inventive cutting machine the edge of the foot plate is flexible, so that an inclined, downwardly directed flexible lip is provided. A corresponding rubber or plastic rib could, for example, be attached to the circumference of the foot plate, however, it is simpler to use a foot plate which is made entirely of a soft elastic material, preferably soft PVC.

Depending on the dimensions of the exhaust air channel, the latter can be used to obtain a certain throttle effect resulting in a decrease in the rotational speed of the compressed air motor, which under certain circumstances can be desirable. A simple way of adjusting the rotational speed of the compressed air motor and/or the thickness of the air cushion beneath the foot plate is obtained by providing a control valve in the exhaust air conduit with the help of which one can either conduct the entire exhaust air to the underside of the foot plate or direct a certain percentage of the exhaust air into the environment immediately behind the compressed air motor, so as to thus decrease the throttle effect and increase the rotational speed of the compressed air motor; at the same time the air cushion is thereby somewhat reduced.

Since compressed air usually contains oil and under certain circumstances also water, it is recommended that the inventive cutting machine be provided with an oil separator for the compressed air, so as to prevent oil and moisture from reaching the surface of the table and the material to be cut. Under certain circumstances it may be desired that the oil contained in the compressed air should lubricate the compressed air motor; if this is the case the oil separator will then be built into the exhaust air conduit.

The known cutting machines having a reciprocating knife blade and an electric drive means are provided with a complicated gear means to actuate a grinding device for the reciprocating knife blade, since grinding members such as grinding belts or wheels must be driven and furthermore, the grinding device must be lowered along the reciprocating knife blade and raised again. In a preferred embodiment of the inventive cutting machine with a reciprocating knife blade at least one compressed air motor is provided for the grinding members; thus, for example, compressed air turbines, which can be built extremely small, can be placed directly on the axes of the grinding wheels. It is also expedient to provide a double functioning compressed air cylinder to lower and raise the grinding device. In this way the complicated gear means for the grinding devices of known cutting machines with a reciprocating knife blade can be eliminated.

Further features, details and advantages of a preferred embodiment of an inventive cutting machine with a reciprocating knife blade will become apparent from the enclosed claims and/or the ensuing detailed specification and the attached drawings of this machine.

Figure 1:
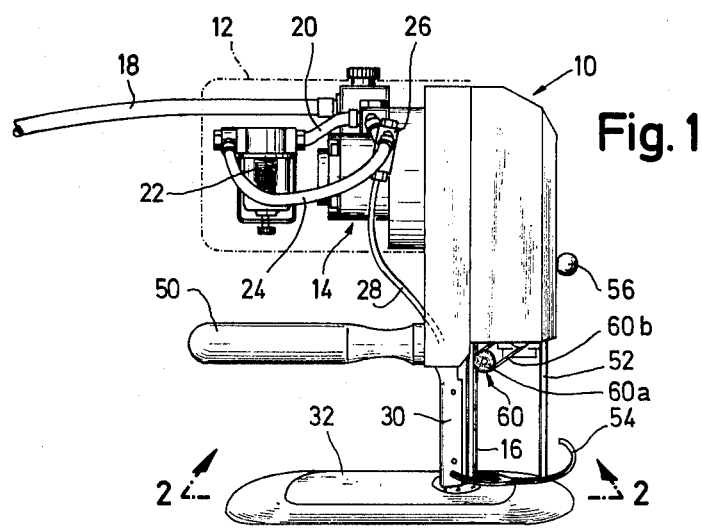
FIG. 1 is a perspective view of the cutting machine comprising a reciprocating knife blade, wherein a cover forming part of the housing of the machine is indicated by dashes and dots.

FIG. 1 depicts a machine housing designated in its entirety as 10 having a cover 12 indicated by dots and dashes. The housing includes a compressed air turbine 14 which raises and lowers a reciprocating knife blade 16 via a crank gear which is not illustrated. The compressed air turbine is connected to a compressed air source, not shown, via a compressed air pipe 18 and the exhaust air issuing from the compressed air turbine is conducted via a pipe connection 20, an oil separator 22 and a pipe connection 24 to a control valve 26 which can be adjusted so as to cause either the entire exhaust air to be conducted into an exhaust air conduit 28 or part of the exhaust air to flow out into the environment at the control valve.

Figure 2:
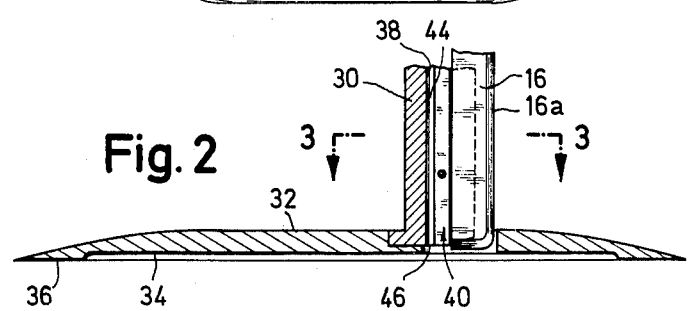
FIG. 2 is a sectional view of the foot plate and the adjacent part of the column along line 2—2 of FIG. 1
Figure 3:
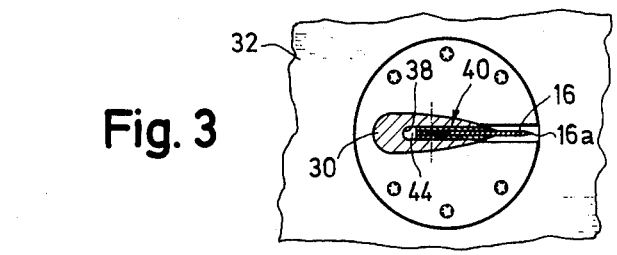
FIG. 3 is a sectional view of the column along line 3—3 of FIG. 2.

The machine housing 10 rests on a column 30 on a foot plate 32 comprising on its underside a shallow recess 34, and only a narrow edge strip 36 remains between said recess and the outer edge of the foot plate. As shown in FIGS. 2 and 3, the column 30 comprises a longitudinal slit 38 in which a knife sheath which guides the reciprocating knife blade 16 and is designated in its entirety as 40 is inserted. Between the rearward edge of the knife sheath 40 facing away from the cutting edge 16a of the reciprocating knife blade and the bottom of the longitudinal slit 38 of the column there is an exhaust air channel 44 into which the exhaust air conduit 28 opens in a manner not illustrated in further detail. The exhaust air channel opens, in turn, into an outlet opening 46 on the underside of the foot plate and the lower end of the reciprocating knife blade 16 also enters said outlet opening as it approaches the lower dead center of its cutting movement.

A handle 50 by means of which the cutting machine is guided, is attached to the machine housing 10. A vertically displaceable supporting rod 52 comprising at its lower end an arm 54 for holding down the material to be cut and encompassing the cutting edge of the reciprocating knife blade in a fork shaped manner is disposed within the machine housing. A detaining knob 56 serves for blocking the supporting rod 52 in, for example, an upper end position.

Furthermore, a grinding device including grinding wheels 60a disposed on both sides of the cutting edge 16a and driven by a compressed air turbine, not illustrated in further detail, and a small belt 60b, is shown in its entirety as 60. Finally, a double functioning compressed air cylinder which is also not illustrated, serves the purpose of lowering the grinding device 60 along the reciprocating knife blade and raising it again into the depicted position of rest.

When the inventive cutting machine is in operation and is driven entirely by compressed air, and the entire or part of the exhaust air flows out of the outlet opening 46 on the underside of the foot plate, a cushion of air is formed underneath the foot plate on which the foot plate, and with it the entire cutting machine, glides lightly over a supporting surface. Owing to the fact that the exhaust air flows uniformly in all directions beneath the foot plate and also due to the fact that the foot plate usually remains completely beneath the sheet material to be cut, the exhaust air does not make a loud noise which is unpleasant over a longer period of time.

I claim:

1. A manually guided cutting machine for sheet material comprising, in combination, a frame including a downwardly extending column, a foot plate secured to the lower end of the column, the foot plate being of flat extensive construction for supporting the machine on a cutting table, the frame having a grip for manual guidance of the machine over the surface of the table, a driven knife blade at the front edge of the column for cutting sheet material overlying the foot plate, an air motor on the frame mechanically coupled to the knife blade, the air motor having an inlet connectable to a source of compressed air and having an outlet for exhaust air, and means defining a conduit for conducting exhaust air from the outlet of the motor to a centrally located confined recess under the foot plate free of any communication with the top of the plate so that the foot plate floats on a cushion of air and with the noise of the exhaust air being muffled by the foot plate and the overlying sheet material.

2. The combination as claimed in claim 1 in which the column has a vertically extending forwardly facing groove formed therein and in which the knife blade is mounted for reciprocation in the groove, the knife blade occupying a normal position in which it is spaced from the root of the groove, the root of the groove forming the conduit for the exhaust air and with the exhaust air serving to dissipate the frictional heat of the reciprocating blade.

3. The combination as claimed in claim 1 in which an oil separator is interposed in the path of the air in the conduit prior to the region of release of the air in the foot plate.

4. The combination as claimed in claim 1 in which the recess on the underside of the foot plate is extensive and shallow occupying the central portion of the area of such underside and communicating with the exhaust air conduit, the recess being surrounded by a land surface, the pressure of the air built up in the recess and the air escaping past the land surface serving to floatingly support the machine.

5. The combination as claimed in claim 4 in which the land surface is of relatively constant narrow dimension so that air tends to be discharged more or less evenly about the periphery of the foot plate.

6. The combination as claimed in claim 4 in which at least the peripheral portion of the foot plate is formed of resilient flexible material so that such portion is capable of conforming to minor irregularity of the supporting surface.

7. The combination as claimed in claim 6 in which the foot plate is entirely formed of a material having the characteristics of soft PVC plastic.

8. The combination as claimed in claim 4 in which a control valve is interposed between the outlet of the motor and the conduit for controlling the flow of air through the conduit, thereby to control the pressure of the air in the recess.

9. A manually guided cutting machine for sheet material comprising, in combination, a frame including a downwardly extending column, a foot plate secured to the lower end of the column, the foot plate being of flat and extensive construction for supporting the machine on a cutting table, the frame having a grip for manual guidance of the machine over the surface of the table, a driven knife blade extending vertically at the front edge of the column for cutting the sheet material overlying the foot plate, and air motor on the frame mechanically coupled to the knife blade, the air motor having an inlet connectable to a source of compressed air and having an outlet for exhaust air, the foot plate being formed with a recess on its underside, the recess being horizontally enclosed by a downwardly presented land surface which extends continuously at least about the periphery of the foot plate, means defining a conduit for conducting exhaust air substantially exclusively from the outlet of the motor to the recess under the foot plate so that the foot plate is floatingly supported on a cushion of air with the noise communicated by the exhaust air being muffled by the overlying foot plate and layers of sheet material which are supported thereon, and valve means for controlling the flow of air through the conduit thereby to control the degree of support.

* * * * *